United States Patent [19]
Bell et al.

[11] 4,367,132
[45] Jan. 4, 1983

[54] METHOD FOR REMOVING LIQUID FROM CHEMICALLY-PRECIPITATED SLUDGE

[75] Inventors: Christy W. Bell; John K. Wittle, both of Berwyn; Charles H. Titus, Newtown Square, all of Pa.

[73] Assignee: Electro-Petroleum, Inc., Wayne, Pa.

[21] Appl. No.: 181,725

[22] Filed: Aug. 27, 1980

[51] Int. Cl.$^3$ ............................................. B01D 13/02
[52] U.S. Cl. ................... 204/180 R; 204/151; 204/152; 204/163 R; 204/169; 210/748; 204/275
[58] Field of Search ........... 204/149, 151, 152, 180 R, 204/186, 267, 284, 263 X, 269 X, 297 X; 210/748

[56] References Cited

U.S. PATENT DOCUMENTS

| | | | |
|---|---|---|---|
| 535,802 | 3/1895 | Lugo | 204/152 |
| 894,070 | 7/1908 | Schwerin | 204/180 R |
| 1,229,203 | 6/1917 | Schwerin | 204/180 R |
| 2,500,878 | 3/1950 | Sieling | 204/300 R |
| 2,571,247 | 10/1951 | Huebotter | 204/180 R |
| 3,236,757 | 2/1966 | Litt | 204/149 |
| 3,347,786 | 10/1967 | Baer et al. | 204/149 X |
| 3,642,605 | 2/1972 | Chenel et al. | 204/300 R |
| 3,664,940 | 5/1972 | Greyson et al. | 204/180 R |
| 3,846,300 | 11/1974 | Inoue | 210/748 |
| 3,920,530 | 11/1975 | Xylander | 204/152 |
| 3,962,069 | 6/1978 | Inoue et al. | 204/300 R |
| 4,101,400 | 7/1978 | Pepping | 204/180 R |
| 4,107,026 | 8/1978 | Freeman | 204/300 R |
| 4,110,189 | 8/1978 | Kunkle et al. | 204/180 R |
| 4,115,233 | 9/1978 | Griffith | 204/180 R |
| 4,132,626 | 1/1979 | Kunkle | 204/180 R X |
| 4,244,804 | 1/1981 | Moeglich | 204/180 R X |

*Primary Examiner*—Howard S. Williams
*Attorney, Agent, or Firm*—Dann, Dorfman, Herrell and Skillman

[57] ABSTRACT

Direct electrical current is passed through a chemically precipitated industrial wastewater sludge to enhance the settling rate, filterability, and dewatering of the sludge.

34 Claims, 7 Drawing Figures

METHOD FOR REMOVING LIQUID FROM CHEMICALLY-PRECIPITATED SLUDGE

BACKGROUND OF THE INVENTION

This invention relates to a method for removing liquid from industrial wastewater sludge and, more particularly, to a method for removing liquid from chemically-precipitated sludge prior to disposal.

Industrial wastewater sludge consists principally of a mixture of solid phases suspended in an aqueous solution of dissolved substances. Sludge of this type is normally processed prior to disposal for the purpose of concentrating the sludge solids and reducing the liquid content of the sludge. Processing of industrial wastewater sludge to reduce its liquid content is commonly referred to as "dewatering". Sludge dewatering is an economic necessity in order to reduce the volume of sludge requiring disposal. Recently, sludge dewatering has come to be regarded as ecologically desirable as well. Legislation passed in a number of jurisdictions now requires that a specific minimum solids content level be met before sludge will be accepted for landfill disposal. The purpose of this legislation is to maintain at a safe level the amount of potentially harmful leachate emanating from landfill sites. In some jurisdictions, a solids content as high as 30 percent is required before sludge disposal in landfills will be permitted.

As a practical matter, it is virtually impossible to obtain sludge meeting these high solids content requirements by prior art dewatering techniques wherein concentration of the sludge solids is carried out in settling lagoons, holding tanks, or similar containment means in which the sludge solids settle by gravitational force.

The presently available mechanical methods for dewatering sludge, such as by vacuum filtration or centrifugation, while capable of producing sludge having a solids content of greater than 30 percent, involve the use of specialized equipment which requires a substantial investment for installation, operaton, maintenance and repair. Further, the known dewatering methods which involve passage of an electric current through the sludge have not proved to be particularly efficient. In general, electrical dewatering occurs at the cathode only. Sludge solids accumulate on the anode in a relatively short period of time and terminate the flow of electric current in, and the removal of liquid from the system, thus necessitating the interruption of the process while the accumulated solids are removed from the anode, or the provison of means for continuously removing the treated sludge from the treatment vessel. Representative prior art dewatering methods involving electrical treatment of the sludge are described in U.S. Pat. Nos. 3,664,940 and 3,962,069. These prior are electrical treatment processes require complex apparatus which contributes significantly to their overall expense. Such unfavorable economic factors have tended to seriously hinder the acceptance and use of electrical sludge treatment on a commercial basis.

Hence, the expense of mechanical and electrical dewatering apparatus makes it uneconomic for many manufacturing plant opertors who have a wastewater disposal problem, and who might advantageously employ an on-site sludge dewatering system.

The development of efficient and effective methods for dewatering industrial wastewater sludge continues to be a highly desired objective.

SUMMARY OF THE INVENTION

The present invention resides in the discovery that the passage of direct electric current through chemically-precipitated industrial wastewater sludge enhances the filterability and settling rate of the sludge solids, and may be used effectively to separate water from the sludge and reduce its water content. Advantage may be taken of the enhanced filterability by forming both electrodes used in treating the sludge from a perforated electrically conductive material, thus permitting removal of liquid from the sludge through both electrodes, and thereby expediting the dewatering of the sludge.

As used herein the expression "chemically-precipitated industrial waste water sludge", or simply "chemically-precipitated sludge", is intended to signify a sludge which has been treated with a chemical conditioning agent, such as lime, ferric chloride, or various polymers. These agents are often added to the waste streams of metal plating, paint, and textile plants, for example, which primarily contain heavy metals, in order to flocculate and precipitate the metals. Chemical conditioning agents have been widely used in dewatering sludge, particularly in mechanical dewatering processes. The expression "base-precipitated sludge", which is also used herein, signifies sludge which has been treated with basic substances, such as sodium hydroxide or lime, and comprises hydroxide precitates of the majority of heavy metal ions in the sludge.

In one aspect of the invention, direct dewatering of chemically-precipitated sludge is achieved by passing direct electric current through the sludge between a pair of perforated electrodes comprising an anode and a cathode. As a result of this electrical treatment, not only does the liquid phase of the sludge flow by electroosmosis toward the cathode, where it is collected after passing through the perforated cathode, but additional liquid diffuses through the sludge solids accumulated at the anode by electrophoresis, passing through the perforated anode, where it too is collected for disposal. The passage of direct electric current through the sludge conditions the sludge solids, thus permitting the passage of liquid through the sludge solids accumulated at the anode. By reason of the removal of liquid from the sludge through both electrodes, the solids concentration of the treated sludge is significantly increased.

According to another aspect of the invention, chemically-precipitated sludge is pre-treated by passing direct electric current through it to enhance its filterability, after which the sludge may be filtered, e.g., by a vacuum filter or belt filter, to reduce its liquid content. The electrical conditioning and filtration of the sludge may be performed step-wise or simultaneously. The sludge may be further dewatered by additional electrical treatment in accordance with the present invention. For example, the pre-treated sludge may be introduced into a treatment vessel containing a pair of spaced-apart electrodes, comprising an anode and a cathode, the cathode being perforated and forming a part of the lower portion of the treatment vessel. A D.C. potential is applied across the electrodes, electroosmotic flow of liquid toward the cathode, the liquid passing through the perforated cathode, and out of the treatment vessel.

In yet another aspect of the invention, chemically-precipitated sludge may be introduced into a settling vessel containing a pair of spaced-apart electrodes comprising an anode and a cathode arranged horizontally within the vessel, with the anode located near the bottom of the settling vessel and a cathode positioned above the anode. A D.C. potential is applied across the electrodes causing the liquid phase of the sludge to flow upward toward the cathode, forming a substantially solids-free supernatant, while the suspended solids are drawn downward toward the anode, thereby effecting rapid settling of the suspended solids. The supernatant is decanted to provide a sludge of increased solids content, which may then be processed further to achieve additional dewatering according to the methods described herein.

the present invention thus provides an efficient, effective, and relatively low cost method for removing liquid from chemically-precipitated sludge, and, in particular, from base-precipitated sludge.

The novel features and advantages of the present invention will become apparent from the following description thereof in conjunction with the accompanying drawing illustrating the presently-preferred apparatus for carrying out the methods of the present invention, in which.

Figure 1:
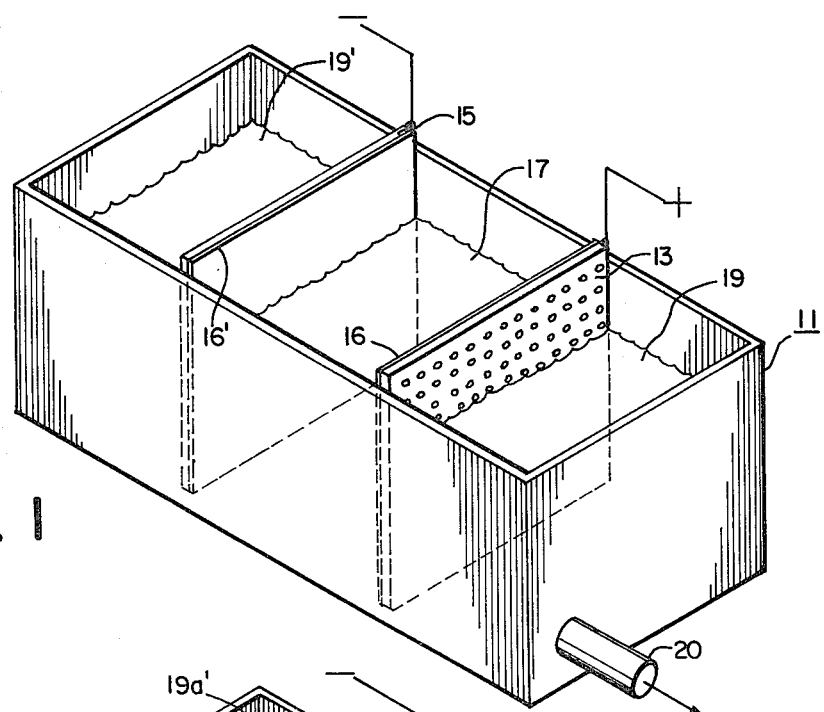
FIG. 1 is a diagrammatic perspective view of a treatment vessel for directly dewatering chemically-precipitated industrial wastewater sludge, having planar electrodes arranged vertically.

Referring more specifically to the drawings, FIG. 1 shows a rectangular treatment vessel 11 for the direct dewatering of chemically-precipitated industrial wastewater sludge (i.e., without additional chemical or electrical pre-treatment) containing a pair of perforated electrodes comprising an anode 13 and a cathode 15. The electrodes are vertically disposed in treatment vessel 11, and extend laterally across the vessel. In this arrangement, the electrodes serve as partitions defining a treatment zone 17 for dewatering sludge between the electrodes, as well as a pair of liquid collection zones, 19 and 19', one associated with each electrode on the side opposite the treatment zone. Chemically-precipitated sludge may conveniently be pumped into treatment zone 17 from above, since the top of treatment vessel 11 is open. The sludge is introduced into treatment zone 17 in a quantity sufficient to at least partially fill the treatment zone and provide a path for the passage of electric current between the electrodes, and a D.C. potential is applied across the electrodes, causing direct electric current to pass through the sludge. Electrical treatment in this manner generates electroosmotic and electrophoretic forces simultaneously in the sludge in treatment zone 17. The electroosmotic force causes the liquid phase of the sludge to flow toward cathode 15. Since it is perforated, the liquid flows through cathode 15 and into collection zone 19'. The electrophoretic force causes the movement of suspended solids in the sludge toward anode 13, where the sludge solids accumulate. Notwithstanding the accumulation of solids at the anode, liquid passes through the perforations of the anode and into collection zone 19. The hole size of the perforated electrodes used in carrying out this invention must be sufficiently small to prevent passage of solids into the collection zones. 105 mesh woven steel cloth has been found to be a satisfactory electrode material. The liquid collected in collection zones 19 and 19' may be removed from the treatment vessel by any suitable discharge means, such as a pump, a siphon or the outlet pipe 20 illustrated in FIG. 1. If the solids content of the treated sludge is less than about 20%, the sludge may be removed from treatment vessel 11 by a pump (not shown). At a solids content greater than 20%, however, the treated sludge is unpumpable and suitable mechanical means well known to those skilled in the art must be provided to remove the sludge from the treatment vessel.

Collection of water at the anode is possible because the electrical treatment of the sludge solids accumulated at the anode renders them more permeable than they would be otherwise. As the density of solids increases in the vicinity of the anode, however, the conductivity of the sludge is reduced. This reduction in conductivity is manifested by an interruption of the flow of liquid in the treatment zone. In order to avoid cessation of the flow of liquid out of treatment vessel 11, the accumulated solid material should be periodically removed from the anode area. However, the operating intervals of the apparatus shown in FIG. 1 are longer than would be the case if a non-perforated anode were employed. This is because the perforated anode allows the movement of liquid and the passage of current between the electrodes for longer periods than would be possible using a non-perforated anode. Furthermore, the amount of liquid removed from the treatment vessel of FIG. 1 in a given period of time is far greater than that which could be removed if only the cathode were perforated.

Figure 1A:
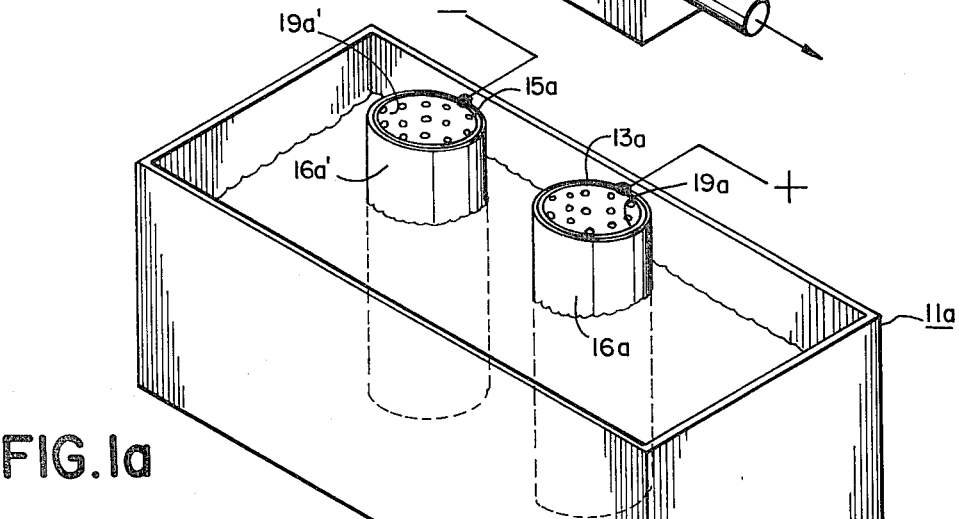
FIG. 1a is a diagrammatic perspecitve view of a treatment vessel similar to that shown in FIG. 1, but having cylindrical electrodes.

FIG. 1a shows a treatment vessel 11a containing electrodes 13a and 15a in the form of hollow cylinders which may be substituted for the planar electrodes shown in FIG. 1. When cylindrical electrodes of this type are employed for dewatering sludge in accordance with the method described above, the space enclosed by the electrodes provide the liquid collection zones 19a, 19a'. Thus, regardless of whether the electrode is planar or cylindrical, a liquid collection zone is provided in association with each electrode on the side opposite the treatment zone.

The electrodes used in carrying out this invention may be selected from a wide variety of materials. Suitable anode materials include iron, stainless steel (austenitic), lead zinc, aluminum, graphite, copper, brass, tin nickel, chromium, and lead oxide ($PbO_2$). Many of these same materials may be used for the cathode. However, the preferred electrode materials are iron, aluminum, $PbO_2$, and graphite because of their low cost and availability. The anode may or may not be consumed in carrying out this invention, depending on its resistance to oxidation, whereas the cathode is not consumed. Although some gassing of the electrodes occurs under normal conditions of use, the gas bubbles do not appreciably affect the operation of the invention.

In practice, it is preferred to provide the perforated electrodes with a liquid pervious, non-conductive membrane on the surface in contact with the sludge so that solids are not transported through the electrode, but water is permitted to pass through the membrane material. In the treatment vessels shown in FIGS. 1 and 1a, for example, each of the perforated electrodes is provided with a membrane 16, 16a. The provision of a membrane on the electrodes is especially necessary for retaining solids in the treatment zone when the perforations in the electrodes are of relatively large size. Suitable membrane materials include polypropylene and rayon fabric.

Figures 1B, 2:
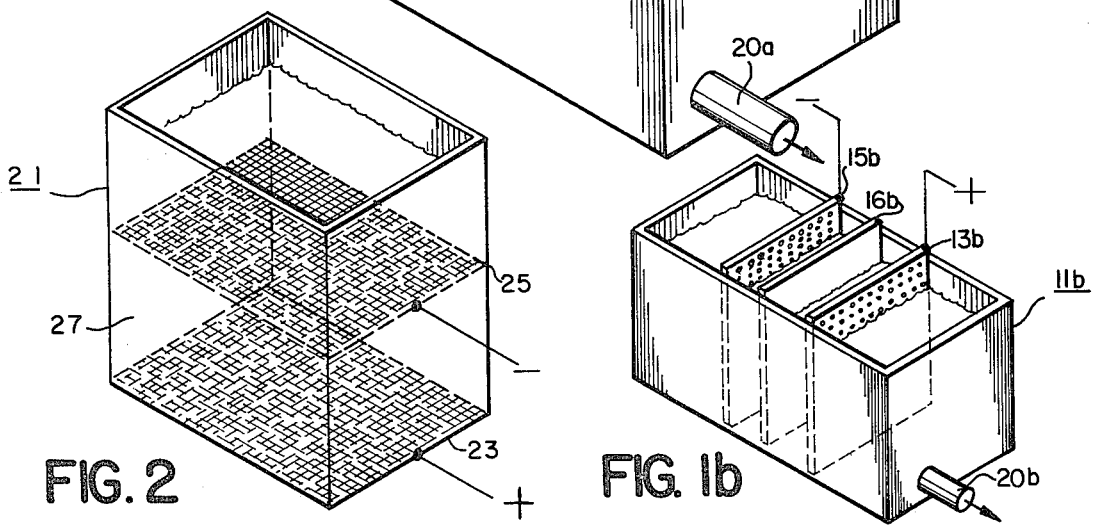
FIG. 1b is another view of the treatment vessel shown in FIG. 1, but having a liquid pervious, non-conductive membrane disposed between the electrodes.
FIG. 2 is a diagrammatic perspective view of another treatment vessel for directly dewatering chemically-precipitated sludge having planar electrodes arranged horizontally.

Instead of providing the liquid pervious, non-conductive membrane directly on the perforated electrodes, as shown in FIGS. 1 and 1a, one or more such membranes of suitable thickness may be disposed between and spaced apart from the electrodes with the surfaces of the membrane facing the electrode. A suitable arrangement is shown in FIG. 1b in which liquid pervious, non-conductive membrance 16b is mounted in treatment vessel 11b between anode 13b and cathode 15b. By operating in this way, a voltage drop is established between the electrodes and the membrane(s) so as to speed up the movement of ionic species in the sludge which pass through the sludge solids accumulated on the membrane(s) at a significant rate and are believed to contribute to the enhancement in the filterability of the sludge solids. If desired, a liquid pervious, non-conductive membrane may be disposed between electrodes which are also provided with such membranes.

Direct dewatering of chemically-precipitated sludge may also be carried out by using the apparatus shown in FIG. 2, which includes a treatment vessel 21 containing a pair of horizontally disposed electrodes, comprising an anode 23 and a cathode 25, the anode forming the bottom of treatment vessel 21. Anode 23 is preferably fabricated from an electrically conductive porous material, such as a metallic screen, to permit passage of liquid therethrough which is collected beneath the vessel. The mesh size of the screen, although exaggerated in FIG. 3, must be sufficiently small to prevent passage of the sludge solids through the anode. Although a planar cathode is illustrated in FIG. 2, other cathode configurations will operate satisfactorily. In addition, cathode 25 may be, but need not be perforated. For example, a cylindrical solid cathode may be employed. As shown in FIG. 2, the electrodes extend across the treatment vessel from side-to-side defining a treatment zone 27 within the vessel between the electrodes. Chemically-precipitated sludge is directly dewatered using the apparatus of FIG. 2 by introducing into the vessel an amount of sludge that is sufficient to make contact between the electrodes, thus providing a path for the passage of electric current between the electrodes. The sludge may, for example, be pumped into vessel 21 through inlet means (not shown) in the side of the vessel between the electrodes. Alternatively, cathode 25 may be removed while sludge is pumped into vessel 21 through the opening at the top and replaced when the desired quantity of sludge has been introduced into the treatment vessel. As in the case of the apparatus shown in FIG. 1, the application of a D.C. potential across anode 23 and cathode 25 causes the liquid phase of the sludge to flow toward the cathode 25 due to electroosmosis, while the sludge solids move toward anode 23 due to the combined effect of electrophoretic and gravitational forces. Electrical treatment in this manner provides a substantially solids-free supernatant liquid in treatment vessel 21, and an accumulation of solids on anode 23. Despite the accumulation of solids on anode 23, a portion of the liquid phase of the sludge flows through the anode and out of the treatment vessel. The flow of liquid through the anode is attributed to the electrical conditioning of the sludge solids which renders them permeable to the passage of liquids. With this apparatus also, if the sludge is treated to the extent that it becomes unpumpable, i.e. solids content greater than 20%, mechanical means must be provided to remove the sludge from treatment vessel 21. Suitable mechanical means for this purpose includes an electrically conductive, endless continuously displaceable screen belt (not shown), such as that shown in U.S. Pat. No. 3,962,069, which serves at once as an anode and a conveyor for removing treated sludge from the treatment vessel.

The treatment vessel shown in FIG. 2 is the preferred apparatus for practicing direct dewatering of chemically-precipitated sludge. One advantage of this apparatus is that the combined effect of electro-phoretic and gravitational forces concentrates the sludge solids at a significantly increased rate over gravitational settling. For example, a sludge having a solids content of approximately 10 percent may be concentrated rather rapidly to a solids content of approximately 16 percent using the apparatus of FIG. 2. In addition, the supernatant may be easily decanted. More importantly, the concentrated sludge solids at the bottom of the vessel are fully exposed to the flow of electric current between the electrodes. It has been determined that the greater the exposure of the sludge solids to the electric current, the greater will be the permeability of those solids. Full exposure of the sludge solids to the flow of electric current does not occur when the electrodes are arranged vertically, as, for example, in the treatment vessel shown in FIG. 1.

The preferred procedure for direct dewatering of sludge using the treatment vessels of FIG. 2 is to impose a voltage across the electrodes for a brief initial period to rapidly agglomerate sludge solids at the anode, since the higher the voltage, the more rapidly the solids move. Thereafter, the electrical treatment proceeds by regulating current rather than voltage, since water transport due to electroosmosis is directly related to current flow in a given configuration.

In addition to the difference between the treatment vessels of FIGS. 1 and 2 insofar as the arrangement of electrodes is concerned, it should be noted that the treatment vessel of FIG. 2, unlike that of FIG. 1, does not have a pair of collection zones within the confines of the treatment vessel. This is because the anode forms the bottom of the treatment vessel shown in FIG. 2. Hence, the collection zone for anode 23 must be located below treatment vessel 21. For example, the liquid effluent from the treatment vessel below the anode may be collected in a suitable collector means, such as a sump (not shown) from which it can be pumped for subsequent disposal.

As indicated above, it is also within the scope of this invention to pre-treat chemically-precipitated sludge to enhance the filterability of the sludge, i.e., the time required to filter a given quantity of sludge. Pre-treatment is preferably accomplished by passing direct electric current through the sludge without simultaneously removing water therefrom.

Figure 3:
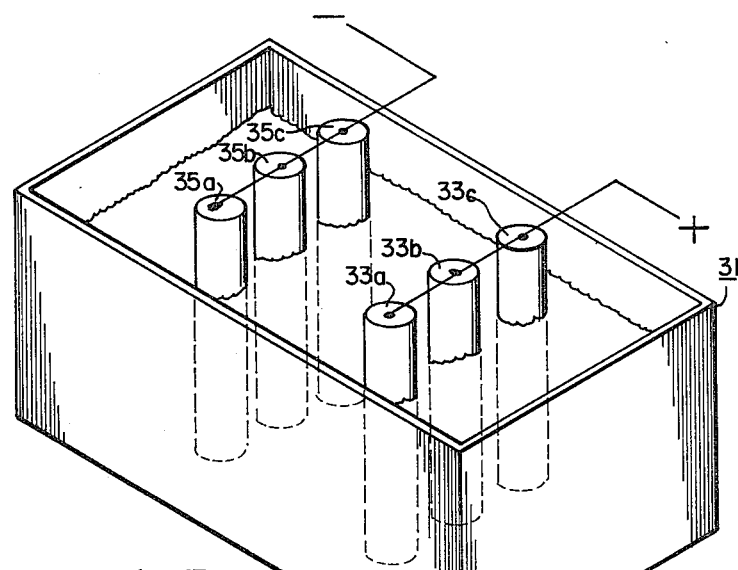
FIG. 3 is a diagrammatic perspective view of a vessel for the batchwise conditioning of chemically-precipitated industrial wastewater sludge in order to enhance the filterability of the sludge.

An apparatus for carrying out batchwise electric pre-treatment of chemically-precipitated sludge is illustrated in FIG. 3. The apparatus of FIG. 3 comprises a pre-treatment vessel 31 containing three pairs of electrodes, each pair comprising a hollow, cyclindrical anode and cathode. The anodes are designated 33a, 33b, 33c, and the cathodes are designated 35a, 35b, 35c. Pre-treatment is effectuated by introducing the sludge into vessel 31 through suitable inlet means (not shown) and applying a D.C. potential across the electrodes, whereupon direct electric current passes through the sludge, agglomerating the solids and enhancing its filterability. The pre-treated sludge may be removed from vessel 31 through a suitable discharge means, such as outlet pipe 37.

Figure 4:
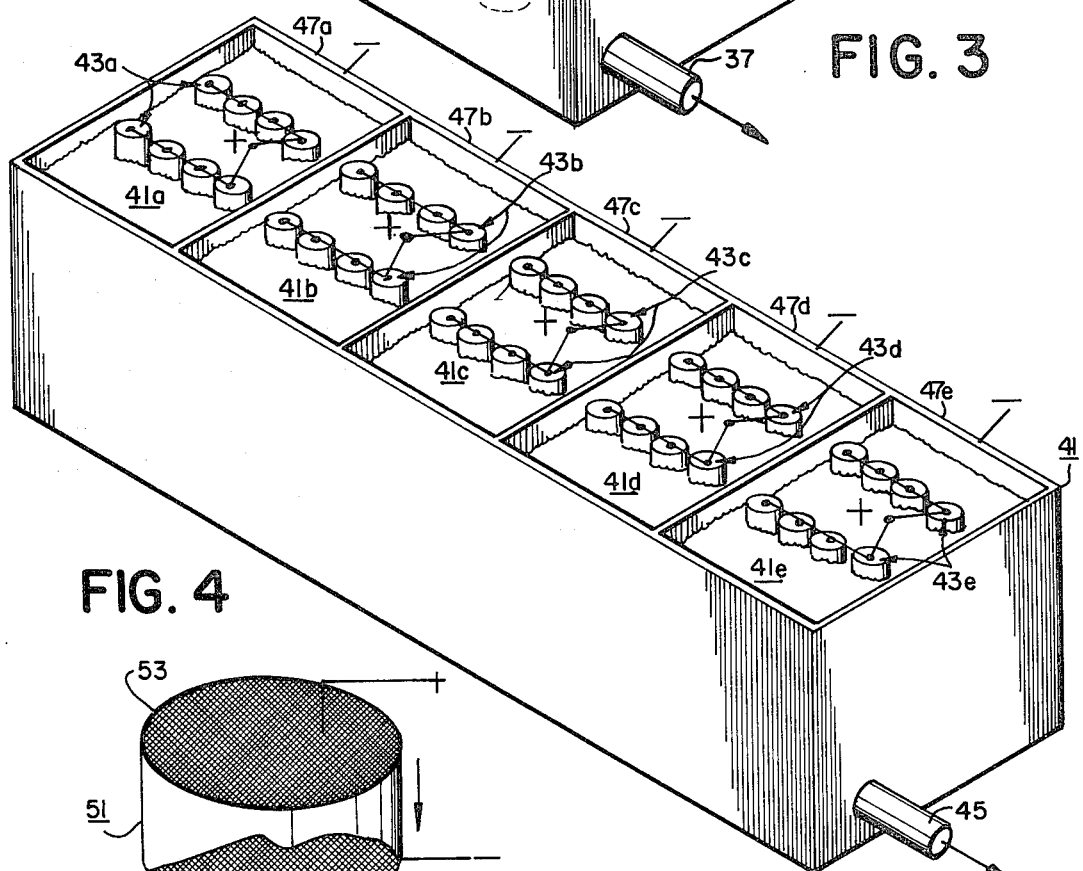
FIG. 4 is a diagrammatic perspective view of a flow-through vessel for the continuous conditioning of chemically-precipitated sludge in order to enhance the filterability of the sludge.

A flow-through apparatus for the continuous pre-treatment of chemically-precipitated sludge is shown in FIG. 4 and comprises a vessel 41 composed of a series of pre-treatment cells 41a, 41b, 41c, 41d, and 41e, each cell containing four pairs, for example, of hollow, cylindrical anodes, generally designated 43a, 43b, 43c, 43d, 43e, with a space therebetween for the passage of sludge. Sludge is introduced through suitable inlet means (not shown) at one end of the vessel and discharged through suitable outlet means 45 at the other end. The internal cell walls are provided with openings (not shown) for passage of the sludge between the cells. A D.C. potential is applied between the anodes and the walls surrounding each cell, 47a, 47b, 47c, 47d, 47e, causing direct electrical current to flow therebetween, thereby conditioning the sludge as it flows through the vessel.

Various means may be employed to attenuate settling out of solids from the sludge bath as it passes through vessel 41. For example, settling may be retarded by the passage of air through the bath, by pump agitation, or by the installation of baffle plates (not shown) in vessel 41 to cause turbulence in the sludge as it flows through the vessel. These means may be used individually or in combination.

A series of tests were undertaken to evaluate the overall efficiency and effectiveness of pre-treatment of base-precipitated sludge using a vessel of the type illustrated in FIG. 3. The results obtained were found to depend upon several factors, including, the time of pre-treatment, the current, the current density, and the temperature of the sludge during pre-treatment. The tests were carried out in a rectangular plexiglass pre-treatment vessel, the dimensions of which were 7 inches by 2 inches by 10 inches deep. The anode and cathode, which were a pair of cylindrical iron-pipes, 1 inch in diameter, were spaced approximately 3 inches apart in the vessel. Each of the electrodes had a constant surface area of 81 cm$^2$. The test were run in batches, and 200 ml. aliquots were taken from the treatment vessel to measure filterability after pre-treatment lasting from 1.5 to 6 hours. Filterability was determined by placing the pre-treated sludge in a steel cylinder having a porous bottom, applying air pressure of 20 psi to the sludge and measuring the time required for air breakthrough. The total volume of sludge treated was 2 liters. As a result of these tests, it was determined that the filterability of base-precipated sludge may undergo a six to forty-five fold improvement by electrical pre-treatment.

More specifically, the test results indicated that the method operated most efficiently at a current density of 0.015 A/cm$^2$ for a treatment period of 2 hours. If the same amount of power is employed for a shorter period, the same improvement in filterability is not observed. Satisfactory results are obtainable, however, with treatment times between 15 minutes and 5 hours, and with current flows between 0.80 and 2.50 A-hr/1, and current densities of from about 0.007 to about 0.04 A/cm$^2$. The power source and the spacing between the electrodes should be such as to ensure a voltage drop of 5 to 50 volts between the electrodes. When operating conditions are outside the above ranges either too much heat is generated or not enough voltage is available to move the sludge. For example, pre-treatment periods shorter than 15 minutes do not produce the desired results, whereas periods of longer than 5 hours have been observed to reverse the desired enhancement of sludge filterability. Current flows lower than 0.80 A-hr./1 have been ineffective while current flows higher than 2.50 A-hr/1 also tend to decrease the effectiveness of the process. Similarly, current densities outside the above range have an adverse effect on the operation of the method. Thus, at current densities below 0.007, insufficient agglomeration results while at current densities above 0.04 undesirable gassing at the electrodes occurs. It has been established that the filterability of the sludge improves with an increase in the sludge temperature during pre-treatment, which occurs as current passes through the sludge. Thus, in going from an initial temperature of 20° C. to 65° C. the time of filterability may be reduced three-fold or more. The optimum pre-treatment temperature appears to be 65° C., though, improved filterability has been achieved over a range of 30° C.-95° C.

The solids content of the sludge has also been observed to have an effect on the extent to which filterability is improved by electrical treatment. It has been found that in order to affect filterability, the current must pass through a sludge in which the suspended solids are made to come into contact with one another. Contact between sludge solids ensures that the electric current must pass through the solids or the liquid on their surface or occluded by them and not short circuit to a considerable extent through the free liquid which is present. The concentration of the solids necessary to achieve the desired contact has been determined experimentally to be between 10 percent and 21 percent by weight. Optimum conditioning of the sludge to improve filterability takes place when the solids concentration is in this range. Upon completion of electrical pre-treatment, the sludge solids have a grainy look, which is quite different from their slime-like appearance before electrical pre-treatment.

When certain chemical additives are incorporated in chemically-precipitated sludge which has been electrically treated in accordance with this invention, the filterability of the sludge may be further enhanced. Alum has this effect, as shown in the following table. This sets forth the results of tests in which base-precipitated sludge containing varying amounts of a 20 percent alum solution was treated for three hours at a current of 1.18 amperes (current density equal to 0.27 A/cm$^2$). The volume of sludge treated in each test was 2 liters. The temperature of the sludge was 65° C. Filterability was determined by use of the filterability device described above in connection with the experimental pre-treatment tests.

TABLE I

| Amount of Alum Added | Filterability |
|---|---|
| 0 ml | 14 min. 12 sec. |
| 10 ml | 6 min. 4 sec. |
| 20 ml | 5 min. 37 sec. |
| 30 ml | 3 min. 13 sec. |

As appears from the data in Table I, the filterability may be reduced by approximately 60 to 80 percent by the addition of alum to the sludge, as compared with a control containing no alum.

It has also been noted that the material from which the anode is made may appreciably affect the degree of improvement of the filterability of chemically-precipitated sludge. This effect is believed to be due to electolytic oxidation of the electrode material which subsequently flocculates in the solution. Iron anodes have a very beneficial effect on the improvement of filterability.

When the chemically-precipitated sludge, as received for disposal, has a solids content less than optimum, it may desirably undergo electrical treatment to enhance the settling rate of the sludge solids. A settling vessel of the type shown in FIG. 2 having horizontally disposed electrodes has been found to be especially useful for concentrating sludge having an original solids content of less than 10 percent by weight. The preferred procedure for achieving rapid settling of the sludge solids is by connecting a relatively high voltage power supply (i.e., one having a capacity of several hundred volts) across the electrodes and passing current through the sludge until the temperature of the sludge reaches 65° C. to 80° C. The power is then turned off until the sludge cools to 30° C. to 50° C. Water, which rises to the surface, is decanted and the procedure is repeated until the sludge solids content reaches 10 to 15 percent. If a settling vessel having a porous bottom is employed, gravity drainage will occur, producing a sludge having a solids content as high as 15 to 20 percent by weight. The on-off application of voltage is used in order to control the temperature of the sludge and reduce the possibility of boiling. When temperatures on the order of 85° C. or higher are reached, it has been found that thermal convection, as well as gas bubbles which are formed, have a tendency to keep the solids in suspension, thus increasing the settling time for the solids.

Upon completion of electrical pre-treatment to improve filterability according to any of the ways described above, the sludge may be filtered by vacuum filtration or by gravity filtration to provide a sludge of substantially reduced liquid content. Filtration is accomplished at a much more rapid rate than is achievable with the same sludge which has not been electrically pre-treated. When pre-treated sludge is subjected to high shear forces, such as would occur if the sludge were pumped from a pre-treatment vessel to a filtration device, no change in filterability of the sludge is observed.

If desired, the pre-treatment and filtration may be carried out simultaneously using the apparatus shown in FIG. 2. As previously mentioned, the horizontal arrangement of electrodes in treatment vessel 21 maximizes the exposure of the sludge solids to the flow of electrical current through treatment zone 27. The perforations in anode 23 permits gravity filtration to occur as the pre-treatment of the sludge proceeds. The apparatus of FIG. 2 also allows for easy removal of the supernatant produced during pre-treatment, which may be accomplished by any suitable means, such as a siphon, or simply by decanting.

Chemically-precipitated sludge which has been pre-treated in the apparatus shown in FIGS. 2, 3, or 4 may undergo additional electrical treatment, in the nature of final dewatering, prior to disposal of the sludge. This additional electrical treatment may be performed directly as the sludge is discharged from the pre-treatment vessel, or the pre-treated sludge may first be filtered using the conventional filtering techniques described above.

Figure 5:
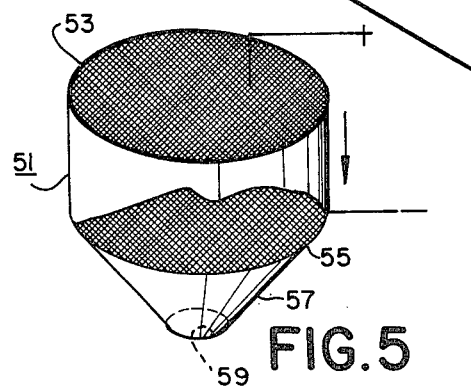
FIG. 5 is a diagrammatic perspective view of a vessel for the final dewatering of chemically-precipitated sludge which has been pre-treated in the apparatus shown in FIGS. 3 or 4.

The preferred apparatus for carrying out the final dewatering is illustrated in FIG. 5 and comprises a treatment vessel 51 containing a pair of spaced-apart electrodes comprising an anode 53 and a cathode 55, the cathode being perforated and forming the bottom of the treatment vessel. Treatment vessel 51 is provided with a funnel-shaped lower portion 57, having an outlet opening 59 to facilitate removal of the liquid effluent from the vessel. Outlet opening 59 may be connected to a discharge conduit for carrying off the liquid removed from the sludge. Although a planar anode is illustrated in FIG. 5, other anode configurations will operate satisfactorily. The anode may be, but need not be perforated. For example, a cylindrical, solid anode may be employed.

A base-precipitated sludge which has been pre-treated to improve its filterability in the manner described hereinabove, and thereafter preferably filtered, is introduced into treatment vessel 51 in sufficient quantity to provide contact between the electrodes. Since the sludge undergoing final dewatering is too thick to be pumped using conventional liquid pumps, mechanical means must be provided to load vessel 51 with sludge. This may be accomplished by a screw feed or belt conveyor which introduces the sludge through inlet means (not shown) in the side of the vessel beyween the electrodes. A D.C. potential is applied across the electrodes. The passage of direct electric current through the pre-treated sludge causes the liquid remaining in the sludge to flow downwardly toward the cathode and out of the treatment vessel. Becuase of the improved filterability of the sludge resulting from the pre-treatment, the sludge cake which forms on the cathode due to gravity does not appreciably interfere with the passage of water through the perforated cathode. The sludge cake may be removed from treatment vessel 51 by the same means described above in connection with FIG. 2.

When the apparatus of FIG. 2 is employed as a pre-treatment vessel, it may be easily converted to a final dewatering vessel, similar to that shown in FIG. 5, simply by reversing the polarity of the electrodes. This permits the entire treatment to be carried out in a single vessel.

When the solids content of the sludge rises above 18 percent by weight as a result of dewatering according to the procedures described hereinabove, the resistivity of the sludge tends to increase, thus reducing the flow of electric current therethrough. If the original current is maintained by increased voltage, the loss of liquid may take place by evaporation and boiling rather than by liquid movement through the solids due to other forces at work in the system. In orderto maximize dewatering while keeping the temperature down as the solid content of the sludge rises above 18 percent by weight, the current must be pulsed in such a manner that water may flow from the system at all times, but current is applied only long enough to maintain the desired temperature in the sludge.

The invention will be further understood by reference to the following specific examples. All of the sludge solids concentrations given in the examples are by weight.

Examples 1 and 2 describe direct dewatering of base-precipitated industrial wastewater sludge by the method of the present invention.

EXAMPLE 1

Direct dewatering of a base-precipitated sludge was carried out in a treatment vessel like that shown in FIG. 1, the dimensions of the vessel being 35½ inches by 10 inches by 12 inches deep. The anode was made of porous iron screen covered with a polypropylene fabric and the cathode was of the same construction. The anode and cathode were placed 22 inches apart. The vessel was filled with 49 liters of sludge having a solids content of 15.37 percent. Current was initially set at 10 amperes and raised to 15 amperes with a D.C. potential of 50 volts applied across the electrodes. Current was passed through the sludge for 16 hours, during which time 1.4 liters of liquid was removed through the cathode and 13.25 liters of liquid was removed through the anode. At the end of the treatment period, a composite sludge sample was taken from the vessel and was found to have a solids content of 26.9 percent as measured by weight loss at 105° C. Also, 19.12 liters of liquid was lost due to evaporation, as measured by difference. While the calculated values for the liquid removed and for the solid content of the remaining sludge do not correspond closely to the measured values set forth above, this may be explained, in part, by the consumption of the anode which promotes concentration of the sludge solids.

EXAMPLE 2

A treatment vessel similar to the one shown in FIG. 2 was constructed with a porous anode of stainless steel forming the bottom of the vessel, and a porous cathode of stainless steel placed four inches above the anode. The vessel, which was in the form of a three-inch diameter tube, was filled with a quantity of sludge having a solids content of 15.7 percent. A D.C. potential of approximately 10 volts was applied across the electrodes and a current of 1 ampere was passed through the sludge for a total of 1 and ½ hours. The height of the liquid level in the vessel was monitored throughout the treatment. A fall in the liquid level was observed from a starting height of 12 inches to a final height of 8 inches. The solids content of the dewatered sludge was found to be in the range of 26.8 percent to 28.9 percent, as measured by gravimetric analysis with drying at 105° C.

The results obtained in Examples 1 and 2 show that a sludge solids content of between 25 and 30% is readily achievable in accordance with the direct dewatering method of the present invention.

Examples 3 and 4 describe methods for improving the filterability of base-precipitated industrial waste water sludge by electrical pre-treatment.

EXAMPLE 3

A 189 liter sample of sludge having a solids content of 11.68 percent was introduced into a pre-treatment vessel of the type shown in FIG. 3. The dimensions of the vessel were three feet on each side by four feet deep. The anode and cathode were made of iron and were spaced 13 inches apart. The potential between the electrodes was 22.5 volts and a current of 100 amperes was passed through the body of sludge. The final temperature of the sludge was 75° C. After three hours a sample of sludge was placed in a pressure filtration device and dewatered until air breakthrough. Using this technique the time to dewater a 20 ml sample of the sludge, as measured by the use of the pressure filtration device was decreased from greater than one hour for untreated sludge to two minutes and 48 seconds for the treated sludge.

EXAMPLE 4

A glass tube, three inches in diameter and having a porous bottom was filled with the treatment sludge of Example 3 to a height of 24 inches. The porous bottom permitted the liquid to permeate through the sludge and out of the tube. In 20 hours the height of the liquid dropped 14 inches. The sludge remaining in the tube had a solids content of 18.34 percent. During a similar 20 hour period, the height of liquid in a control containing sludge taken from the same source as the sludge treated in Example 3, but which had not undergone the treatment in Example 3, dropped only 4 inches. A 14 inch drop in the height of the liquid of the control did not occur for an additional 6 days.

Examples 3 and 4 demonstrate the substantial improvement in filterability that is obtainable by electrical pre-treatment in accordance with this invention.

Example 5 describes the rapid concentration of sludge solids by the passage of direct electric current through the sludge.

EXAMPLE 5

The settling vessel was a 500 ml glass cylindrical tube 1¾ inches in diameter and 14½ inches long containing horizontally disposed electrodes. The anode was located near the bottom of the vessel and the cathode was spaced about 11 inches from the anode. The anode and cathode were both circular disks 1½ inches in diameter, fabricated from 105 mesh steel screen. The settling vessel was filled with sludge and a D.C. potential of 75 volts was applied across the electrodes. A vessel of the same dimensions but containing no electrodes, was also filled with sludge to serve as a control. A current of 0.05 amperes was passed through the settling vessel for a total of 1.5 hours during a three hour period. The sludge was then permitted to settle and both the height of sludge and the solids content were measured. The level of the treated sludge in the settling vessel was measured at 9.5 inches while the level in the control was at 10.125 inches. The solids content of the sludge in the settling vessel was between 13.4 percent at the top of the sludge layer and 16.4 percent at the bottom, whereas the control measured 12.9 percent at the top and 13.5 percent at the bottom.

Example 6 describes the final dewatering of base-precipitated industrial wastewater sludge which has been electrically pre-treated to improve its filterability.

EXAMPLE 6

700 ml of sludge, which was pre-treated to enhance its filterability by a procedure similar to that described in Example 3, above, was placed in a treatment vessel of the type illustrated in FIG. 5. The dimensions of the vessel were 6 inches in diameter by 2½" deep. A D.C. potential of 10 volts was applied across the electrodes and a current of one ampere was passed through the sludge. After three hours, 200 ml of liquid was driven from the vessel through the cathode. The solids content of the sludge remaining in the vessel had increased from an initial content of 18.34 percent to a final content of 27.77 percent.

While the industrial wastewater sludge employed in the foregoing examples was base-precipitated sludge, similar results are obtainable with sludge treated with other conditioning agents, such as phosphate slimes, for example.

Those skilled in the art will appreciate that the procedures described in the foregoing examples are intended merely to illustrate and not to limit the invention, the practice of which is capable of wide variation and modification without departing from the scope and spirit of the invention as set forth in the appended claims.

We claim:

1. A method for removing liquid from a chemically-precipitated industrial wastewater sludge comprising the steps of:
    a. introducing the sludge into a treatment vessel containing a pair of spaced apart perforated electrodes, comprising an anode and a cathode, said electrodes defining a treatment zone within said vessel between said electrodes and a liquid collection zone associated with each electrode on the side opposite said treatment zone, said sludge at least partially filling said treatment zone and contacting said electrodes;
    b. applying a direct electric potential between said anode and cathode thereby causing the liquid phase of the sludge to flow toward said cathode and sludge solids to move toward said anode, said liquid flowing through said cathode into the collection zone associated therewith, and effecting a flow of liquid through said anode into the collection zone associated therewith; and
    c. removing the liquid from said collection zones.

2. The method of claim 1 wherein the sludge is a base-precipitated sludge.

3. The method of claim 2 wherein said electrodes are planar, extending laterally across said treatment vessel.

4. The method of claim 2, wherein said electrodes are cylindrical.

5. The method of claim 2, wherein each of said electrodes is provided with a liquid pervious, non-conductive membrane on the side facing said treatment zone.

6. The method of claim 2 wherein at least one liquid pervious, non-conductive membrane is provided in the treatment zone between the electrodes, the surfaces of said membrane facing said electrodes.

7. The method of claim 2 wherein the original solids content of said sludge is from about 2% to about 30% by weight.

8. A method for removing liquid from a chemically-precipitated industrial wastewater sludge comprising the steps of:
    a. introducing the sludge into a treatment vessel containing a pair of spaced-apart electrodes, comprising an anode and a cathode, said anode being perforated and forming a part of the lower portion of said treatment vessel, said sludge being in contact with said electrodes; and
    b. applying a direct electric potential across said anode and cathode thereby causing the liquid phase of the sludge to flow toward said cathode and the sludge solids to move toward said anode to provide a substantially solids-free supernatant liquid in said vessel, and effecting a flow of liquid through said anode and out of said treatment vessel.

9. The method of claim 8 wherein the sludge is a base-precipitated sludge.

10. The method of claim 9 wherein said anode is provided with a liquid pervious, non-conductive membrane on the surface contacting said suspension.

11. The method of claim 9 wherein at least one liquid pervious, non-conductive membrane is provided between and spaced apart from said electrodes, the surfaces of said membrane facing said electrodes.

12. The method of claim 9 wherein said supernatant liquid is removed from said treatment vessel.

13. The method of claim 9 wherein the original solids content of said sludge is less than about 10% by weight.

14. A method for removing liquid from a chemically-precipitated industrial wastewater sludge comprising the steps of:
    a. pre-treating said sludge to enhance the filterability thereof by passing direct electric current through said sludge;
    b. introducing the pre-treated sludge into a treatment vessel containing a pair of spaced-apart electrodes, comprising an anode and a cathode, said cathode being perforated and forming a part of the lower portion of said treatment vessel, said pre-treated sludge being in contact with said electrodes; and
    c. applying a direct electric potential across said anode and cathode, thereby causing the liquid phase of said sludge to flow toward said cathode, said liquid flowing through said cathode and out of said treatment vessel.

15. The method of claim 14 wherein the sludge is a base-precipitated sludge.

16. The method of claim 15 wherein said cathode is provided with a liquid pervious, non-conductive membrane on the surface contacting said sludge.

17. The method of claim 15 wherein at least one liquid pervious, non-conductive membrane is provided between and spaced apart from said electrodes, the surfaces of said membrane facing said electrodes.

18. The method of claim 15 wherein liquid is removed from said pre-treated sludge prior to introduction into said treatment vessel.

19. The method of claim 18 wherein said pre-treated sludge is filtered to remove said liquid therefrom.

20. The method of claim 15 wherein the pre-treatment comprises:
    a. introducing the sludge into a pre-treatment vessel, containing a pair of spaced-apart electrodes, comprising an anode and a cathode, said anode being perforated and forming part of the lower portion of said pre-treatment vessel, said sludge being in contact with said electrodes; and
    b. applying a direct electric potential across said electrodes, thereby causing the liquid phase of said sludge to flow toward said cathode and the sludge solids to move toward said anode to provide a substantially solids-free supernatant liquid in said pre-treatment vessel, and effecting a flow of a portion of liquid phase through said anode and out of said pre-treatment vessel.

21. The method of claim 20, wherein said anode of said pre-treatment vessel is provide with a liquid pervious, non-conductive membrane on the surface contacting said sludge.

22. The method of claim 20, wherein at least one liquid pervious, non-conductive membrane is provided between and spaced apart from the electrodes in said pre-treatment vessel, the surfaces of said membrane facing said electrodes.

23. The method of claim 20, wherein said supernatant liquid is removed from said pre-treatment vessel.

24. The method of claim 15 wherein direct electric current is passed through said sludge during pre-treatment for a period of from about 15 minutes to about 5 hours, at a current density of from about 0.007 to about 0.04.

25. The method of claim 15 wherein the temperature of the sludge is between about 30° C. and about 95° C.

26. The method of claim 15 wherein alum is added to the sludge prior to the pre-treatment step.

27. The method of claim 15 wherein the original solids content of the sludge is from about 10% to about 21% by weight.

28. A method for removing liquid from a chemically-precipitated industrial wastewater sludge comprising the steps of:
   (a) introducing said sludge into a settling vessel containing a pair of spaced-apart electrodes, comprising an anode and a cathode, arranged horizontally within said vessel such that said cathode is above said anode, said sludge being in contact with said electrodes;
   (b) applying a direct electric potential across said electrodes;
   (c) terminating said electric potential;
   (d) allowing said sludge to settle to provide a substantially solids-free supernatant liquid in said settling vessel;
   (e) removing supernatant liquid from said settling vessel to provide a sludge of increased solids content;
   (f) pre-treating said sludge of increased solid content by passing direct electric current therethrough to enhance the filterability thereof;
   (g) introducing the pre-treated sludge of increased solids content into a treatment vessel containing a pair of spaced-apart electrodes, comprising an anode and a cathode, said cathode being perforated and forming part of the lower portion of said treatment vessel;
   (h) applying a direct electric potential across said electrodes thereby causing a flow of liquid toward said cathode, said liquid flowing through said cathode and out of said treatment vessel.

29. The method of claim 28, wherein the sludge is a base-precipitated sludge.

30. The method of claim 29, wherein said settling vessel is provided with a porous bottom.

31. The method of claim 29, wherein liquid is removed from said pre-treated sludge of increased solids content prior to introduction into said treatment vessel.

32. The method of claim 31, wherein said pre-treated sludge of increased solids content is filtered to remove said liquid therefrom.

33. The method of claim 18, 20 or 30 wherein the final electrical treatment includes applying said direct electric potential intermittently across said electrodes.

34. A method for removing liquid from a base-precipitated industrial wastewater sludge comprising the steps of:
   a. passing direct electric current through the sludge to agglomerate the sludge solids and enhance the filterability thereof;
   b. terminating the flow of electric current through said sludge; and
   c. filtering said sludge.

* * * * *

UNITED STATES PATENT AND TRADEMARK OFFICE
CERTIFICATE OF CORRECTION

PATENT NO. : 4,367,132
DATED : January 4, 1983
INVENTOR(S) : Bell et al.

It is certified that error appears in the above-identified patent and that said Letters Patent is hereby corrected as shown below:

Column 3, line 13, "the" should read --The--.
Column 9, line 23 "a" should read --A--.
Column 10, line 65, "orderto" should read --order to--.
Column 12, line 58, "Example6" should read --Example 6--.
Column 13, line 6, "27.77percent" should read --27.77 percent--.

Column 1, line 64, "opertors" should read -- operators --.

Signed and Sealed this

Twenty-fourth Day of May 1983

[SEAL]

Attest:

DONALD J. QUIGG

Attesting Officer

Acting Commissioner of Patents and Trademarks